United States Patent [19]

Smith et al.

[11] Patent Number: 4,984,294

[45] Date of Patent: Jan. 8, 1991

[54] RADIO COMMUNICATIONS DEVICE INCORPORATING CHANNEL GUARD DECODE AND PRIORITY CHANNEL SCANNING

[75] Inventors: Michael W. Smith; Michael B. Heilman, both of Forest, Va.

[73] Assignee: General Electric Company, Lynchburg, Va.

[21] Appl. No.: 219,125

[22] Filed: Jul. 15, 1988

[51] Int. Cl.$^5$ .............................................. H04B 17/02
[52] U.S. Cl. ..................................... 455/166; 455/34; 455/161; 455/212; 455/228; 379/63
[58] Field of Search ................... 455/32, 34, 35, 38, 455/161, 166, 212, 228, 33, 36; 379/59, 63

[56] References Cited

U.S. PATENT DOCUMENTS

| | | | |
|---|---|---|---|
| 3,617,895 | 11/1971 | Tomsa | 455/166 |
| 3,657,655 | 4/1972 | Fukata | 455/228 |
| 3,750,032 | 7/1973 | Andrews | 455/166 |
| 3,902,122 | 8/1975 | Sisson et al. | 455/35 |
| 3,962,645 | 6/1976 | Stewart | 455/35 |
| 4,021,653 | 5/1977 | Sharp et al. | 455/35 |
| 4,123,717 | 10/1978 | Yiv et al. | 455/166 |
| 4,498,194 | 2/1985 | Vandegraaf | 455/166 |
| 4,573,210 | 2/1986 | Heck | 455/166 |
| 4,633,515 | 12/1986 | Uber et al. | 455/166 |
| 4,776,037 | 10/1988 | Rozanski, Jr. | 455/166 |

Primary Examiner—Gerard R. Strecker
Assistant Examiner—Andrew Faile
Attorney, Agent, or Firm—Nixon & Vanderhye

[57] ABSTRACT

A significantly improved scanning method and apparatus is disclosed which allows tone channel guard decode and scan to optimally coexist on the priority channel. In an exemplary embodiment of the present invention, tone channel guard decoding processing is divided into three processing windows. The first window (hereinafter referred to as SHORTLOOK) serves to indicate whether channel guard might be present. If the SHORTLOOK window processing indicates that the correct channel guard might be present, then a further processing window, hereinafter referred to as SECONDLOOK, is initiated. If at anytime during the SECONDLOOK time period, a second predetermined threshold is exceeded, the system is informed that the correct channel guard tone pattern is most probably present. The audio is then unmuted, even though the SECONDLOOK time period expires before the channel guard tone pattern is capable of being reliably detected in accordance with conventional standards. A LASTLOOK window is utilized when the SECONDLOOK window has detected a tone and opens the audio. During the LASTLOOK window, a further tone channel guard detect threshold is monitored. If this threshold is exceeded, then the priority channel audio is allowed to remain active, thereby serving as a check on the determinations made in the SHORTLOOK and SECONDLOOK windows.

48 Claims, 9 Drawing Sheets

RADIO COMMUNICATIONS DEVICE INCORPORATING CHANNEL GUARD DECODE AND PRIORITY CHANNEL SCANNING

FIELD OF THE INVENTION

This invention generally relates to a digitally controlled radio communications devices. More particularly, the invention relates to a radio communications method and apparatus incorporating both channel guard decoding and priority channel scanning.

BACKGROUND AND SUMMARY OF THE INVENTION

Mobile and/or portable radio transceiving devices have heretofore incorporated a "channel guard" decoding option which permits an operator to selectively call desired parties by transmitting a low frequency tone or digital data pattern. The "channel guard" coding option (which is also referred to as a continuous tone coded squelch system (CTCSS) or a continuous digital coded squelch system (CDCSS)) provides a means of restricting calls to specific radios. Only the desired parties' receivers are programmed to decode the transmitted tone or digital data pattern.

By using the channel guard option, many users can share a repeater system with only the receivers programmed to receive the particular transmitted channel guard code being enabled to receive a transmitted message. The transmitted tones in a tone channel guard system may, for example, range from 67 Hz to 210.7 Hz. in 0.1 Hz steps.

Radio systems incorporating tone channel guard features include tone processing circuitry for processing and decoding the received tones to detect a proper tone sequence. To process such low frequency tones to correctly detect predetermined channel guard tone patterns, it is necessary for the tone processing circuitry to include RC time constants which are long enough to preserve the tone signal pattern to permit reliable decoding of noisy signals. Thus, a considerable period of time, e.g., 250 milliseconds for 100 Hz, may be required to decode a channel guard pattern.

Mobile and/or portable radio transceiving devices have also heretofore incorporated channel scanning to permit monitoring a priority channel while listening to an active channel. A priority channel is a channel which is designated to be the channel on which the radio operator can always be reached. Such a radio's channel scanning algorithm controls the scanning of the activity on the channels to check for activity on the priority channel more frequently than activity on any other channel. If activity is detected on the priority channel, the radio immediately switches to the priority channel.

In mobile radio communication systems utilized by public services (such as the state police, highway patrol, or fire department), there is a need and an expectation that, as soon as a message is transmitted on a priority channel, the receiving party will be permitted to listen to the message. For example, a dispatcher communicating the location and important details of an ongoing robbery or fire, demands a rapid return to the priority channel without any significant delay.

Mobile radio communication systems utilized by such public service organizations have heretofore included channel guard in their scanning algorithms to take advantage of the ability to share a repeater system with only the receivers programmed to receive the particular transmitted channel guard being enabled to receive the transmitted message. However, such public service mobile radio communication systems, have not heretofore included channel guard for the priority channel.

In this regard, in such conventional radios, it may take up to 400 milliseconds to detect the carrier and channel guard tone pattern. Such a time period is much too long for the typically short transmission made during public service operations. Thus, checking a priority channel for carrier activity and decoding a channel guard tone pattern will place a hole in the active channel's audio which may serve to delete words from a conversation. Clearly, the deletion of words from an emergency communication cannot be tolerated. Thus, existing radios which incorporated scanning for channel guard, but which stopped on a channel for a fixed interval of 400 milliseconds (and which therefore left significant gaps in the audio) are not satisfactory for use by state police, the highway patrol or other public service organizations.

In a product designed for business and industrial use, General Electric's MLS radio system permitted tone channel guard decode and scan to coexist on the priority channel by incorporating a "partial look" technique for determining whether a channel guard tone pattern might be present. If this initial look indicates that the channel guard pattern is not present, then the unit returns to the non-priority channel. If, however, the initial look indicates that the channel guard might be present, then the unit stays for an additional time interval window to guarantee the correct channel guard is present before opening the audio.

This approach, while cutting down on the length of time required to spend on decoding of the channel guard on the priority channel and allowing more time to listen to the correct audio on the non-priority channel, was still not satisfactory to meet public service organization needs. In this regard, the partial look required on the order of 175 milliseconds to determine whether channel guard might be present. In this system, a fixed time interval is utilized for all the channel guard patterns. Additionally, in this system, the audio is not unmuted until the correct channel guard is decoded. Accordingly, in the MLS radio system, significant portions of an emergency communications on a priority channel would be lost.

The present invention incorporates a significantly improved scanning algorithm which allows tone channel guard decode and scan to optimally coexist on the priority channel. In an exemplary embodiment of the present invention, the scanning algorithm divides the tone channel guard decoding processing into three processing windows. The first window (hereinafter referred to as SHORTLOOK) serves to indicate whether channel guard might be present.

Instead of employing a fixed time period for all channel guard frequencies, the present invention uses a method of scaling the timing windows. For example, the SHORTLOOK time period is set depending on the channel guard frequency being decoded so that when decoding high frequency tones (e.g., 210.7 Hz), a determination may be made to abort the decoding operation and return to the active channel with a smaller window which results in a minimized hole in the audio. A timer is utilized to define the variable length of the SHORTLOOK window. The SHORTLOOK window is set to such a short period of time that the tone cannot be guaranteed to be present but it is long enough to determine that a tone is not present.

During the SHORTLOOK window, an input channel guard tone pattern is repetitively sampled during a predetermined number of interrupt periods. Depending upon the state of the sampled tone pattern at each interrupt, a value is associated with the sample which accumulates over time (and which is hereinafter referred to as the vector of the sampled tone pattern). The growth of this vector over time indicates the likelihood of the presence of the correct channel guard tone pattern. At the end of the SHORTLOOK time period, if the magnitude of the vector exceeds a predetermined threshold, then a flag is set indicating that a correct channel guard tone pattern might be present.

If the SHORTLOOK window processing indicates that the correct channel guard might be present, then a further processing window, hereinafter referred to as SECONDLOOK, is initiated. If at any time during the SECONDLOOK time period, a second predetermined threshold is exceeded, the system is informed that the correct channel guard tone pattern is most probably present. The audio is then unmuted, even though the SECONDLOOK time period expires before the channel guard tone pattern is capable of being reliably detected in accordance with conventional standards.

If the first or second thresholds are not exceeded during the SHORTLOOK or SECONDLOOK windows, then the scan returns to the non-priority channel. Thus, the present invention serves to shorten the time period in which holes appear in the active channel audio. If, however, during the SECONDLOOK window, the second threshold is exceeded, then the priority channel audio is opened so that for, example, a police officer may receive communications prior to the time period that is conventionally required to perform a full length tone channel guard decode operation. By utilizing the SECONDLOOK window, the time period of the SHORTLOOK window may be minimized Thus, a determination that a tone channel guard is not present may be quickly made to keep the audio blanking time down to the shortest possible time.

In accordance with the present invention, a LASTLOOK window is utilized when the SECONDLOOK window has detected a tone and opens the audio. During the LASTLOOK window, a further tone channel guard detect threshold is monitored. If this threshold is exceeded, then the priority channel audio is allowed to remain active, thereby serving as a check on the determinations made in the SHORTLOOK and SECONDLOOK windows.

The present invention uses a plurality of scan rates to minimize the percentage of time audio is lost while looking at the priority channel and listening to a non-priority channel. If no activity is detected on the priority channel, then the priority channel is sampled rapidly, e.g., every 300 milliseconds. If, however, there is carrier activity on the priority channel, but an incorrect tone channel guard, then the priority channel is sampled at a slower rate, e.g., every second. This results in a constant blanking time to minimize lost audio on the active non-priority channel.

BRIEF DESCRIPTION OF THE DRAWINGS

These as well as other objects and advantages of this invention will be better appreciated by reading the following detailed description of the presently preferred exemplary embodiment taken in conjunction with the accompanying drawings of which.

DETAILED DESCRIPTION OF THE DRAWINGS

Figures 1, 4:
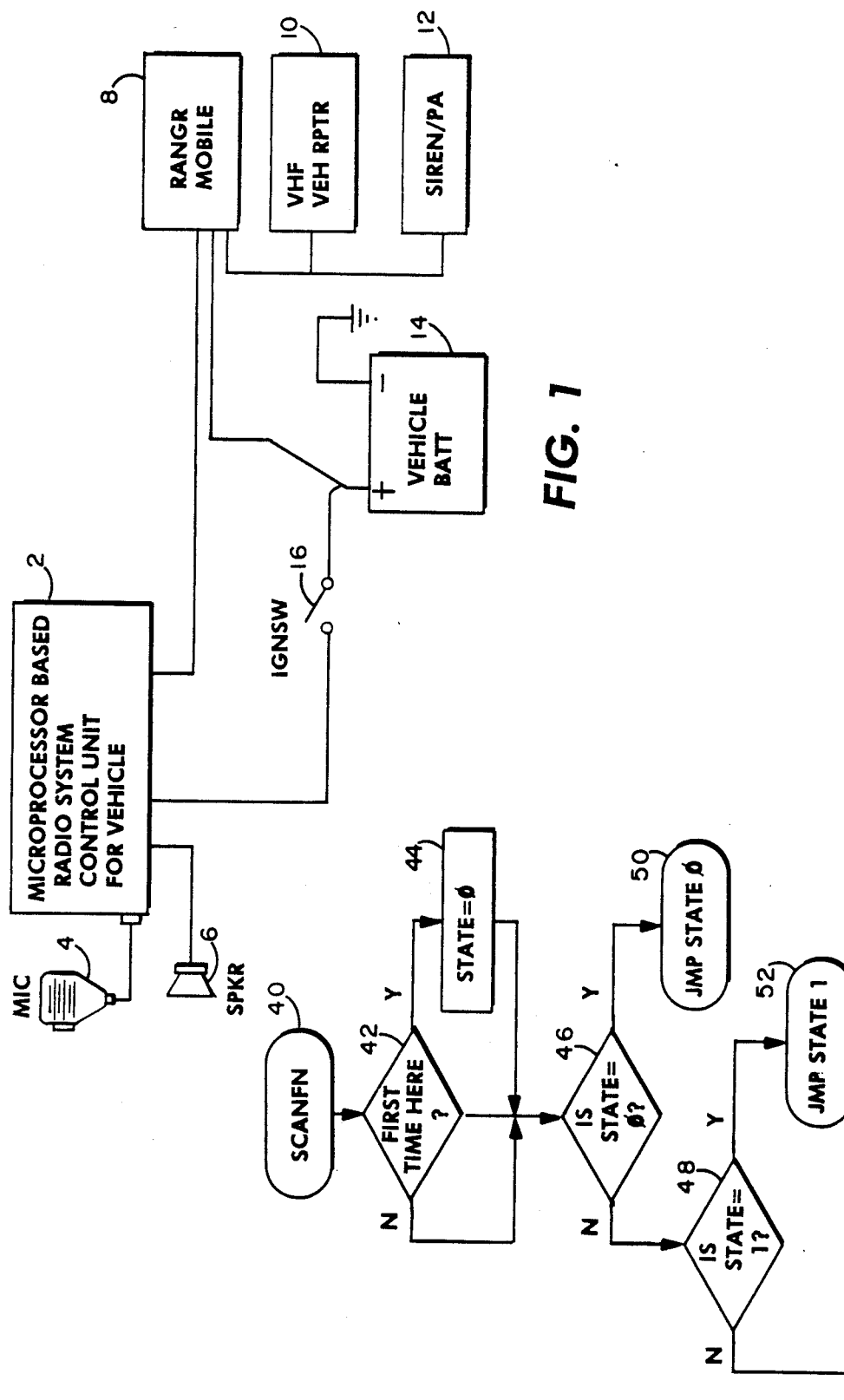
FIG. 1 is a schematic block diagram of a vehicle based mobile radio communication system in accordance with an exemplary embodiment of the present invention.
FIG. 4 is a flowchart of the scan function subroutines which determines the current state of the scanning algorithm.

FIG. 1 shows a block diagram of an exemplary radio communications system for use by a public service organization such as the state police or highway patrol. By way of example only, the structure shown in FIG. 1 is incorporated into a police motor vehicle and is powered by the vehicle battery 14 upon closing of the ignition switch 16.

The heart of the radio communications system of the present invention is a microprocessor-based radio system control unit 2. Control unit 2, associated microphone 4, and speaker 6 are mounted in the front of the vehicle to provide convenient operator access. The low band ranger mobile 8, the repeater 10 and the siren unit 12 are preferably mounted in the vehicle trunk.

The microprocessor-based radio control unit 2 incorporates all the required hardware and software for conventionally controlling the low band ranger mobile 8, which is the radio system's transceiver in the exemplary embodiment of FIG. 1. Thus, the control unit 2 serves to download operating information to the transceiver 8, checks for active radio keys, controls any of the key functions determined to be active, updates any volume, squelch or frequency changes, etc. In order to avoid obscuring the unique aspects of the present invention, the description which follows will not describe in detail the conventional features performed by the control unit, but rather will focus on those functions controlled by control unit 2 relating to the channel scanning and channel guard decoding features of the present invention.

The control unit 2 also enables the operator to control the optional vehicle repeater 10. In this regard, an officer may leave the vehicle while carrying a portable, high band radio and utilize the vehicle repeater 10 (in conjunction with the low band mobile 8 and the control unit 2) to retransmit messages on low band frequencies to obtain the same range of transmission with the portable radio as is available with the low band ranger mobile 8.

It is noted that the "low band" ranger mobile 8 is merely an exemplary transceiver which operates in a low band frequency range utilized by public service organizations such as the highway patrol and should not be construed as limiting the scope of the present invention. As is conventional, the low band ranger mobile 8 includes transmitter and receiver circuitry, and a transceiver control unit for controlling the interaction between the receiver and transmitter. As will be appreciated by those skilled in the art, the transceiver control unit may include a microprocessor which controls the frequency of transmission or reception. Frequency information for transceiver control unit is downloaded from the microprocessor-based control unit 2 as will be described below.

The radio system shown in FIG. 1 also includes an optional siren and/or PA module 12. This module permits an officer to sound a siren or convey messages over a public address system via his microphone 4. The microphone 4 may, for example, include, push to talk buttons, CPTT and SPTT. CPTT controls transmissions on a "C" channel and SPTT control transmissions on a "S" channel. When the PA is enabled, the CPTT becomes the PA push to talk button.

Figure 2:
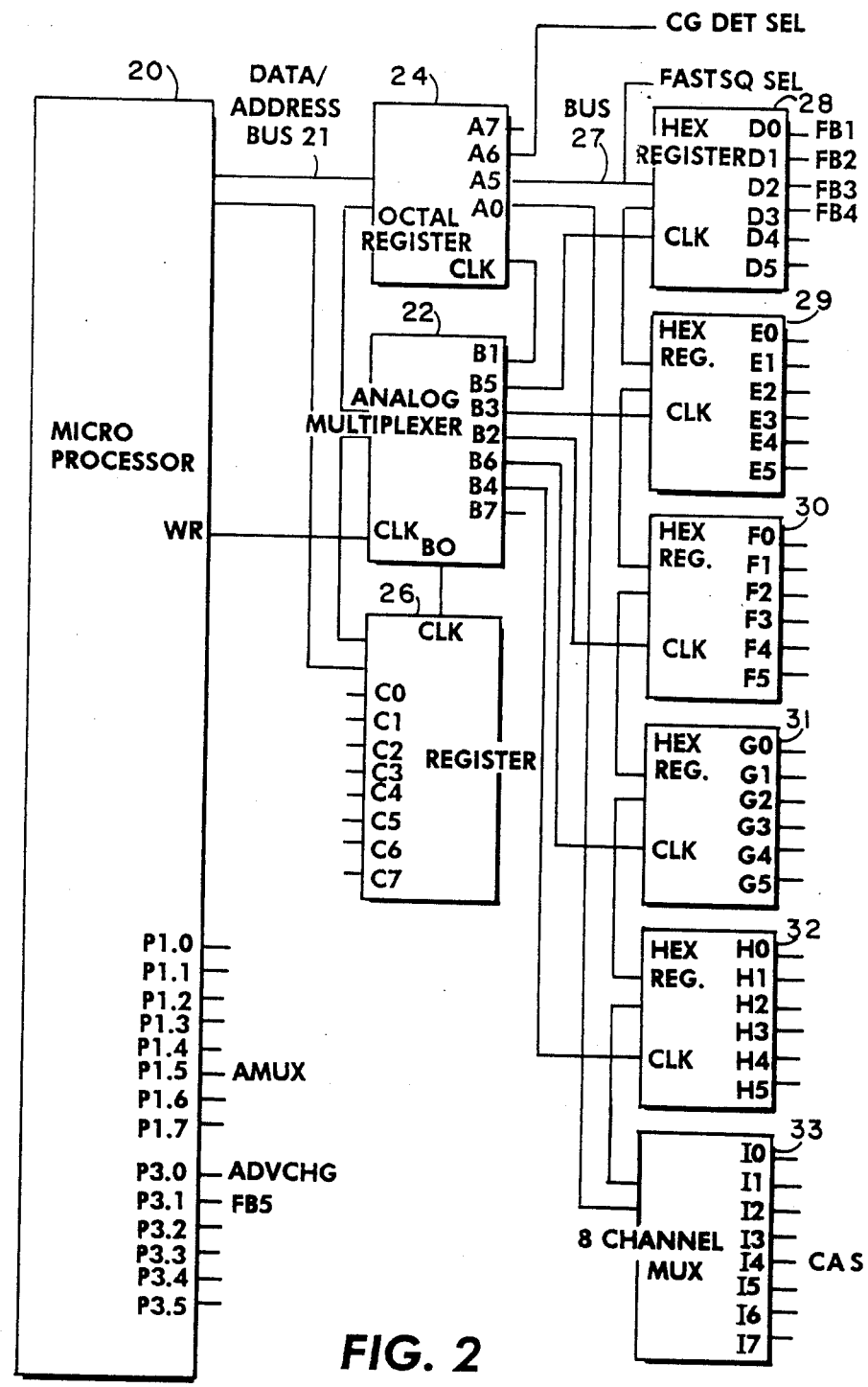
FIG. 2 is a more detailed block diagram of the microprocessor-based control unit shown in FIG. 1.

FIG. 2 is a more detailed block diagram of the microprocessor-based control unit 2 shown in FIG. 1. Control unit 2 includes microprocessor 20 which may, for example, be an INTEL 8031 8-bit microprocessor. Also associated with the microprocessor is a programmable read-only memory (not shown), which may, for example, be an INTEL 27256 EPROM. Additionally, microprocessor 20 is associated with at least one additional memory module (not shown) for storing user specific "personality" data. Personality data is customer dependent data which determines such radio operating parameters as the RF operating frequency, the CTCSS tones to be generated, etc., that are required to meet a user's specific needs.

In the exemplary embodiment of the control unit 2 shown in FIG. 2, the integrated circuits 22, 24, and 26 which will be described below are disposed on the same printed circuit board as the microprocessor 20. Integrated circuits 28-33 are physically disposed on a second printed circuit board within the control unit 2. The two circuit boards are interconnected by bus 27.

Focussing on the integrated circuits in more detail, the control unit 2 includes an interface 24 which may, for example, comprise an octal register that permits the microprocessor 20 to communicate with the integrated circuits 28-33 on the second control board. The integrated circuit device with which microprocessor 20 communicates is selected by analog multiplexer 22 based on address data received via data/address bus 21.

More particularly, based on the address data received via bus 21, an analog multiplexer output pin is selected thereby designating a predetermined device to be enabled for communication. For example, if output pin B1 of analog multiplexer 22 is selected by microprocessor 20, the clock input of interface 24 receives a signal thereby enabling interface register 24 for communication with component 28-33. Each of the input/output pins associated with components 24, 26, and 28-33 are memory mapped through analog multiplexer 22. The analog multiplexer 22 passes the write pulse generated by microprocessor 20 at its clock input to the addressed component 28-33.

As shown in FIG. 2, control unit 2 also includes a register 26, which is likewise connected to data/address bus 21. Register 26 is a latch which receives data to be displayed on the liquid crystal display (not shown) of the control unit 2.

As noted above, control unit 2 shown in FIG. 1 controls a wide range of conventional radio system processing tasks. Accordingly, dedicated pins are provided in the control unit of FIG. 2 for either receiving signals from the radio system related to such conventional tasks or for outputting control signals for controlling such tasks. Only those input/output signals which are related to controlling the channel guard decode and scanning features of the present invention will be described in detail in conjunction with FIG. 2. Although signals are shown as being dedicated to specific integrated circuit pins it should, of course, be recognized that the microprocessor 20 may be readily programmed to generate such signals on other pins via other circuits.

Focussing on interface register 24, the microprocessor 20 generates a signal via pin A6 of interface register 24 which is a channel guard detect select signal. The generation of the channel guard detect select signal initiates the sampling of an incoming channel guard pattern. As will be described further below on pin A5 of interface register 24 is used to transmit a fast squelch select signal generated by microprocessor 20.

Coupled to interface register 24 via bus 27 is hexidecimal register 28. Frequency signals FB1-FB4 are temporarily stored in register 24 and are transmitted to the low band ranger transceiver 8 shown in FIG. 1 via pins D0-D3. In this fashion, the low band ranger mobile unit 8 is informed as to which frequency to go to.

Components 29-32 in FIG. 2 are each hexidecimal interface registers which serve to transmit conventional control signals via pins EO-E5, FO-F6, GO-G5, and HO-H5, respectively, which are not particularly germane to the present invention. In this regard, audio switching, volume control, public address control, and other standard features are controlled via the control signals generated by microprocessor 20 which are transmitted to the ranger mobile 8 and other units in the radio system via particular ones of the above-mentioned pins.

Control signals are input to the microprocessor 20 via an 8 channel input multiplexer 33. On pin 14 of the 8 channel multiplexer 33, a carrier activity sensor signal CAS is received which identifies whether an RF carrier has been detected by the radio.

Microprocessor 20 also includes a number of input/output pins P1.0 through P1.7, and P3.0 through P3.7. Of particular relevance to the present invention, pin P1.5 receives a signal labelled "AMUX". The signal is multiplexed between FASTSQ input and the limited channel guard signal from the radio. FASTSQ is a quick squelch detector used to determine if a channel has a carrier before starting the CG decode. The limited channel guard signal is required for microprocessor 20 to decode the received channel guard pattern. Additionally, on pin P3.0, a signal is generated by the microprocessor labelled "ADVCHG" which is used in setting the radio on frequency. Microprocessor 20 also includes an output pin P3.1 on which a signal labelled "FB5" is generated in conjunction with FB1–FB4 to set the ranger mobile transceiver 8 to a specific frequency.

As noted above, microprocessor 20 executes the software required to handle conventional radio operation functions such as checking for any active keys, performing active key functions, updating any volume, squelch or frequency changes, etc. These processing functions are repetitively handled in a radio operation processing routine, hereinafter referred to as the main routine.

Among the tasks repetitively executed in the main routine are channel guard background tasks. During such channel guard background task processing, functions are performed which are involved in channel guard decoding. For example, if the operator changes channels, the radio system's interrupt structure is modified so that a new channel guard frequency can be decoded. Thus, if a channel change occurs, the system is loaded with a new channel guard frequency and interrupt structure.

Additionally in channel guard background task processing, a subroutine call to a scan function is executed. In this regard, a check is made to determine whether the scan function is enabled and if so, a scan routine is executed which scans other frequencies in the system while continuously monitoring the user's priority channel.

The channels are scanned at a very rapid rate to detect the presence of a carrier at a particular frequency using, for example, fast squelch and slow squelch detection circuits. A check is also made to determine whether the channel on which a carrier is present includes the correct channel guard sequence. If the correct channel guard is detected, then the receiver's audio is opened and control is returned to the main radio system processing routine.

In channel guard decoding, microprocessor 20 utilizes an interrupt sampling technique to determine whether a correct tone frequency pattern has been received which operates as follow. The microprocessor 20 branches from its currently executing routine and samples the channel guard input on pin P1.5 in FIG. 2 eight times per period (where the period is the inverse of the desired channel guard frequency). At each of the eight interrupts, the channel guard signal at pin P1.5 is checked to determine whether there is a high to low signal transition.

If a high to low transition is detected, a "vector" position is incremented to indicate the occurrence of such a transition at a particular one of the eight interrupts. Thus, a cumulative indicator is maintained to reflect the signals transitions from high to low in each of the eight interrupt periods.

For a particular channel guard frequency, the falling edge occurs in the same interrupt window during each period. The interrupt vector positions are continuously summed. If the correct channel guard frequency is input on pin P1.5, it can be empirically demonstrated that the vector grows rapidly. Alternatively, if a frequency is received on pin P1.5, which is not the correct channel guard frequency, the high to low transitions will occur in various interrupt windows and the vector will not grow rapidly.

Thus, there is a correspondence between the accumulated vector length over time and the desired channel guard frequency. If a predetermined vector length threshold is exceeded, the channel guard frequency has been detected.

The threshold that the vector length must exceed to confirm the presence of the channel guard frequency is constant for all frequencies. In accordance with the present invention, the time periods defining the timing windows during which the vector thresholds are compared with the vector length vary in accordance with the channel guard frequency.

By way of example only, the SHORTLOOK window referred to above expires after 6½ periods, where a period is 1 divided by the correct channel guard frequency. Thus, in contrast to utilizing a fixed time period at the end of which a partial look is taken to determine whether channel guard may be present, the present invention uses a method of scaling the SHORTLOOK time period based on frequency.

For each channel guard frequency, the period for the SHORTLOOK and SECONDLOOK windows is recalculated to determine the point in time at which each window expires. Thus, the SHORTLOOK time period is much longer for 100 Hz channel guard than for a channel guard of 200 Hz. The number of periods for the SECONDLOOK window may, for example, be on the order of 11 periods of the desired channel guard signal.

Figure 3:
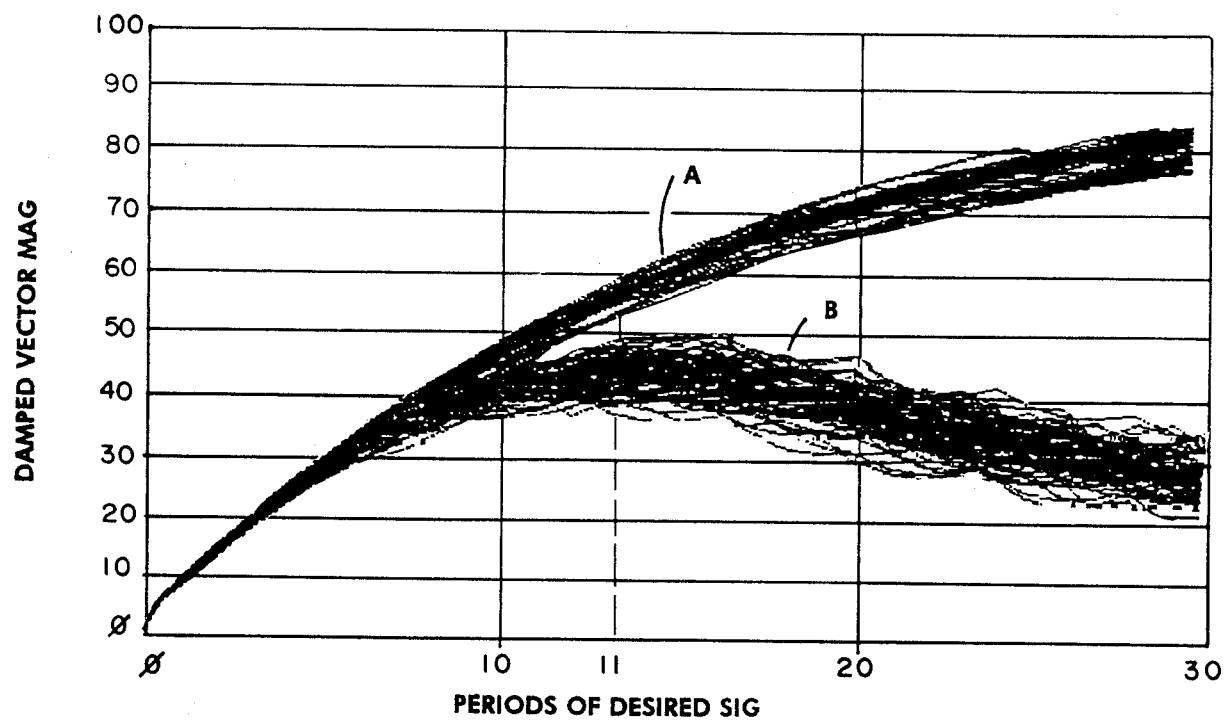
FIG. 3 is a plot of vector magnitude versus time expressed in terms of number of periods of the desired channel guard signal.

The growth of the aforementioned vector is highly predictable for a desired channel guard frequency. FIG. 3 is a plot of vector magnitude versus time expressed in terms of number of periods of the desired channel guard signal. The vector is damped to prevent it from growing indefinitely and is accordingly referenced on the graph as a damped vector magnitude.

In the plot shown in FIG. 3, the desired channel guard frequency "A" is 156.7 Hz. A received tone frequency at 161.4 Hz with a signal to noise ratio of 12 dB generated a vector as indicated by the bottom "B" curve. Since the received tone frequency is at the system's 3% tolerance range, the received tone should not be detected as a valid channel guard pattern. It falls below the selected threshold.

At approximately 11 periods of the desired channel guard frequency, a vector magnitude of approximately 51 as indicated by the cross-hair symbol is shown. The sampling of frequencies that are correct all fall above the cross-hair, while those frequencies which fall outside of the detect bandwidth fall below the cross-hair.

Thus, by setting a vector length threshold at the point indicated by the cross-hair, one can accept frequencies which exceed the 51 threshold at 11 periods and reject frequencies having a vector magnitude of at least 51. Signals that are received which are off the channel guard frequency will be out of phase during the sampling periods and will produce a vector magnitude which is lower than on frequency signals.

Based on the data shown in FIG. 3, it can be seen that if the vector magnitude exceeds approximately 11 after approximately 11 periods of the desired channel guard signal, then the received signal is most probably on-frequency. The value of the threshold can be determined empirically as shown in FIG. 3.

The vector magnitude threshold of 51 is the threshold for the SECONDLOOK window. If this SECONDLOOK threshold is exceeded by the vector length, then the channel audio is unmuted at a point earlier in time than in a conventional radio which awaits total completion of the channel guard decoding.

At the end of the SHORTLOOK, SECONDLOOK and the LASTLOOK windows mentioned above, if the total vector length exceeds the respective SHORT-LOOK, SECONDLOOK, and LASTLOOK thresholds then flags are set which indicate these conditions. The scanning algorithm, to be described in detail below, checks the state of each of these flags and modifies its flow of control in accordance with whether or not the flags are set.

The scanning algorithm in the exemplary embodiment of the present invention incorporates a sequence of "states". Each state, as will be explained below, includes an associated set of channel scanning and/or channel guard detection processing functions which are performed during the state. A location in memory keeps track of which state the software is currently executing. A state may be called many times while waiting for a timer to expire or an event to occur (such as detecting the channel guard tone) which triggers the entry into yet another state.

Before describing in detail the scanning algorithm states which are particularly related to the channel guard detection techniques of the present invention, the scanning algorithm will first be generally described. The scan software to be described below is dynamic. In this regard, if the scan has just been turned on, the state will be automatically initialized to zero and then will be advanced to state one. In state one, a channel is downloaded from the microprocessor 20 to the transceiver 8 and the carrier squelch integration is initialized. In state two, the integration is performed and if a carrier is found, then channel guard is loaded and the SHORTLOOK timing window is initiated.

In state six, the SHORTLOOK flag is checked after the SHORTLOOK timer expires to determine if channel guard might be present. State 12 looks for the detection of the SECONDLOOK flag to see if the correct channel guard is most probably present. If the SECONDLOOK flag is set before the SECONDLOOK timer expires then the audio is unmuted and the scan stops. Additionally, the LASTLOOK timer is initiated, and a final check is performed to insure that channel guard is present.

If the scan is locked on the priority channel, then no further scanning is done. However, if the scan is locked on the non-priority channel then a timer is started to scan the priority channel. This timer is dynamic and is based on the previous condition of the priority channel. If the last sample of the priority channel showed no carried activity, then the scan will be every 300 milliseconds. However, if the last sample showed carrier activity but an incorrect channel guard, then the scan will be approximately every second.

Turning now to the details of the scanning routine, as noted above, in repetitively performing channel guard "background" tasks, the main routine continuously executes the scan routine. Initially, the scan function subroutine (40) shown in FIG. 4 is called to determine what state the scan routine is supposed to be in and to initiate branching to that state.

As indicated at block 42, a check is made to determine whether the current pass through the scan function loop is the first pass. It is noted that the channel guard background processing routine, upon determining that the channel has been changed (besides loading a new channel guard tone) initializes the scan software to state zero. Thus, if the channel has just been changed, the check at block 42 yields a "yes" response and serves to set the state to be equal to zero (44).

Alternatively, if the check at block 42 reveals that the current pass is not the first pass through this loop, then a check is made at 46 to determine whether the current state is equal to zero. If the state has just been set to zero at block 44, the test at block 46 initiates a jump to state zero (50). If the current state is not equal to zero, then a check is made at 48 to determine whether the current state is equal to one. If so, then the scan routine jumps to state one (52). If not, similar checks are sequentially made for each of the other states to thereby result in the performance of the appropriate scanning or channel guard detection related function.

Figure 5:
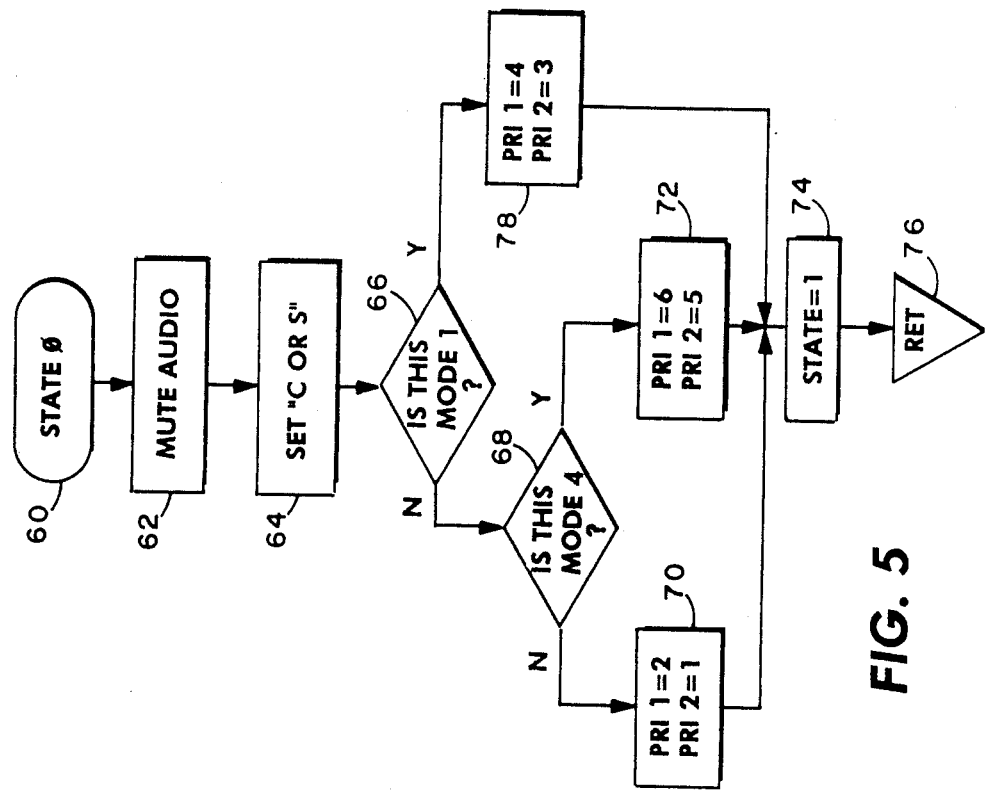
FIG. 5 is a flowchart showing the sequence of operations occurring during state zero, and which relate to scan initialization state.

Turning next to FIG. 5, this figure is a flowchart showing the functions which occur in state zero, the scan initialization state. After entry into state zero (60), the audio is muted (62). By way of example only, the routine shown in FIG. 5 is for a two channel (hereinafter referred to as the C and S channels) scanning algorithm. In this example, the C channel is the priority channel and the S channel is the non-priority channel. Although only two channels are scanned, it should be recognized that the scanning algorithm is applicable to scanning any predetermined number of channels.

As indicated at block 64, initially a flag "CorS" is set to a binary "1" to indicate that the C channel is being scanned or to a "0" state to indicate that the S channel is being scanned. In blocks 66 and 68 checks are made to determine which of two scanning modes the system is in (i.e., mode 1 or mode 4). If the system is in mode 1 as indicated at block 66, channels 4 and 3 are scanned (78). Thereafter, the system is set to state one (74), after which the routine will return control to the main routine. Of the channels selected in modes 1 and 4, it is noted that the PRI 1 channel corresponds to the priority C channel and the PRI 2 channel corresponds to the non-priority S channel referred to in block 64. RAM locations are reserved for identifying the PRI 1 and PRI 2 channels which have been set.

If the system is not in the mode 1 scan, then a check is made at block 68 to determine whether the system is in a mode 4 scan. If the system is in mode 4, then the system is set to scan channels 6 and 5 (72). If the system is not in mode 4 or mode 1, then scanning is set to take place on channels 2 and 1 (70) after which the system is set to state one and control is returned to the main routine (74, 76).

Thus, by virtue of the scan initialization routine, the initial frequencies which are going to be scanned are set up. At the end of state zero the state is automatically advanced to state one. In this fashion, the next pass through the scan function routine shown in FIG. 4, automatically results in branching to state one.

Figure 6:
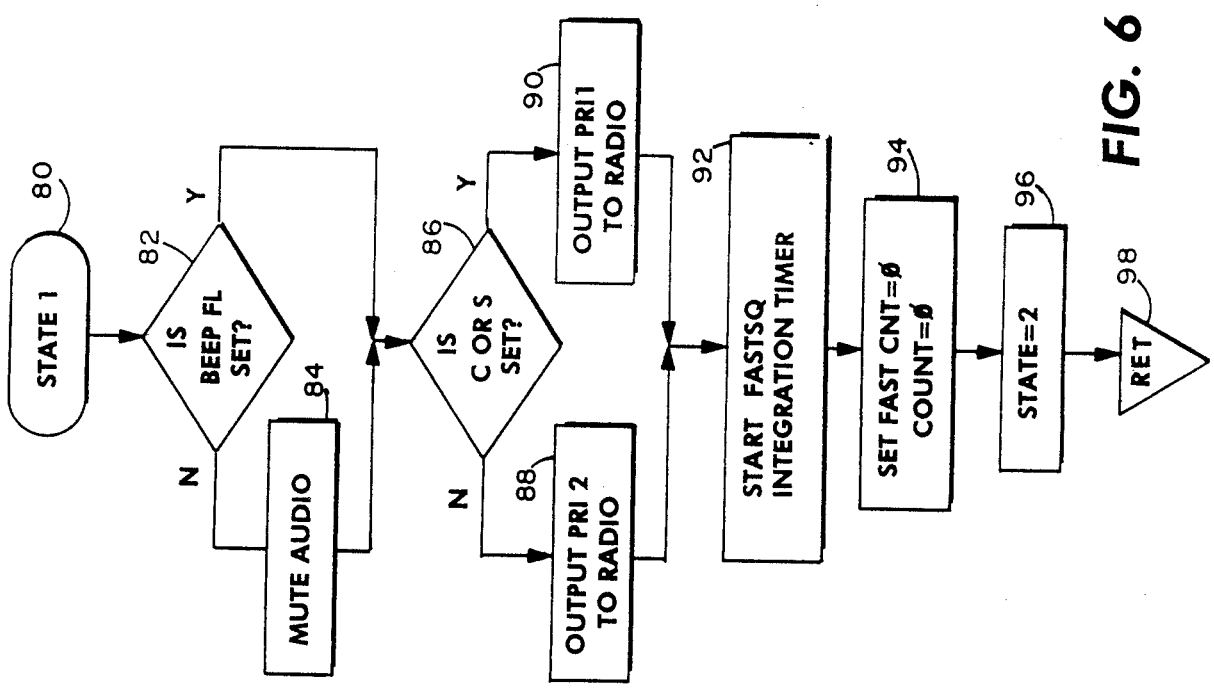
FIG. 6 is a flowchart showing the sequence of operations during state 1, which related to loading the channel to be scanned.

As shown in FIG. 6, entry into state one (80) sets up the radio to load the channel to be scanned independent of channel guard considerations. At block 82, a check is made to determine whether a beep flag ("BEEPFL") has been set. If the beep flag is set, then a beep is sounded whenever the operator hits a control key. If the beep flag is not set (as indicated by the check at 82), then the audio is muted at 84. The scan algorithm keeps the audio muted until it detects activity.

Thereafter, a check is made at block 86 to determine whether the C or S channel is the channel which the radio is ready to scan (as indicated by the state of the "CorS" flag). If the "CorS" flag is set to a 1, then the PRI 1 channel is output to the radio transceiver 8 (90). In this regard, the channel identifier that is stored in the RAM location PRI 1 is output to the radio. If the "CorS" flag is not set, then the channel stored at RAM location PRI 2 is output to the radio transceiver 8 (88). Upon reception of the channel identifying indicia, the radio transceiver 8 switches to the identified channel.

After the appropriate channel is output to the radio, as indicated at block 92, a fast squelch integration timer is initiated in order to rapidly detect whether a carrier is present. Typically, the fast squelch timer expires after 14 milliseconds. At, for example, every 2 milliseconds intervals, the fast squelch input is sampled to determine whether there is a carrier present. Based on these seven samples (during state two) a determination is made as to whether a carrier is present.

As indicated at 94, counters identified as FASTCNT and COUNT are initialized. These counters are utilized in the fast squelch integration in state two. As indicated at block 96, the state is set to 2 and control is returned to the main routine (98).

Figure 7:
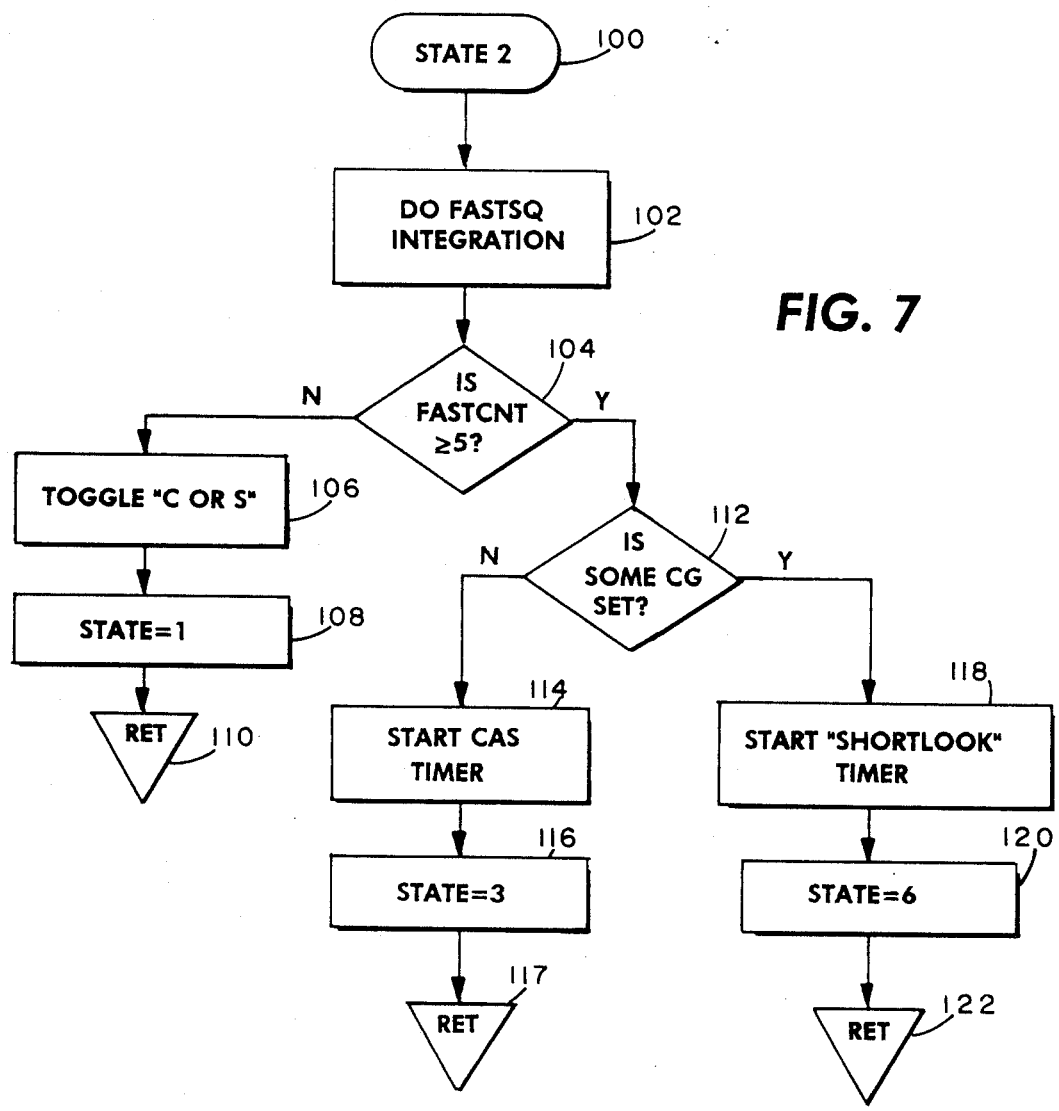
FIG. 7 is a flowchart showing the sequence of operations occurring during state 2, which relate to determining whether a carrier is present.

As shown in FIG. 7, in state number 2 (100), the fast squelch integration is performed to determine whether a carrier is present (102). In this regard, as noted above, every 2 milliseconds the squelch input is sampled and if the sample suggests that a carrier is present, then the FASTCNT counter is incremented. Additionally, the COUNT counter is incremented to insure that seven samples are taken.

After seven samples have been taken, as indicated by the state of the COUNT counter, a determination is made (104) as to whether the FASTCNT count is greater than or equal to 5. Although block 104 indicates that the count must be greater than or equal to 5, it is noted that the count merely has to be high enough to indicate that a carrier is present.

If the check at block 104 indicates that the channel has no carrier activity at all, then there is no further need to remain at that channel and the "CorS" flag is toggled (106) to initiate switching to the other channel. Thereafter, the state is set to be equal to 1 (108) and control is returned to the main routine (110). In this fashion, the new channel will be loaded in accordance with the operations previously described in conjunction with FIG. 6.

If the test at block 104 indicates that a carrier is present, then a check is made at block 112 to determine whether the channel has the channel guard option associated with it. If there is no channel guard associated with the channel, then the SHORTLOOK timing window is not initiated, but rather a carrier activity squelch (CAS) timer is initiated (114) to test to make sure that the fast squelch indication that a carrier is present is not a false indication of the presence of the carrier. Thereafter, the state is set to state three (116) and control is returned to the main routine (117).

If the check at block 112 indicates that the channel has the channel guard option associated with it, then a SHORTLOOK timer is initiated (118). As noted above, the SHORTLOOK timer runs for a period of time dependent upon the desired channel guard frequency. For example, if the channel guard frequency is 100 Hz, the timing window for which the SHORTLOOK timer is set is equal to 6.25 times the channel guard period (i.e., 1/100) or 0.0625 seconds. Thereafter, the state is set equal to six (120) and control is returned to the main routine (122). Once the SHORTLOOK timer is initiated at 118, a channel guard timer is also initiated to in turn initiate the channel guard interrupts described above to control the sampling of the channel guard input to determine whether the received signal has transitioned from a high to low state as described above.

Figure 8:
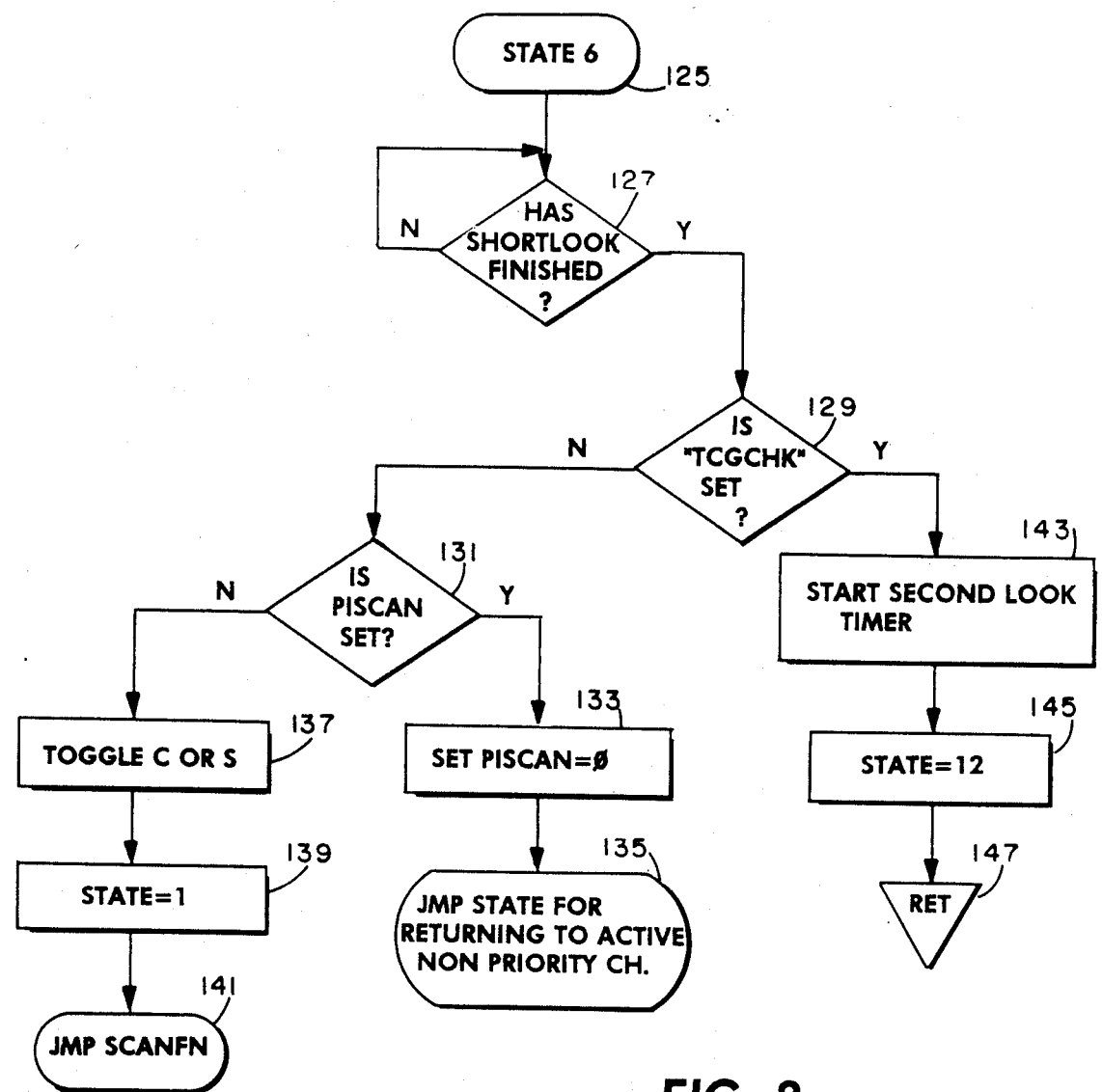
FIG. 8 is a flowchart showing the sequence of operations occurring during state 6, which relate to channel guard detection during the SHORTLOOK window.

Turning to FIG. 8, after state 6 is entered (125), a check is made to determine whether the channel guard SHORTLOOK timer has expired (127). If the timer has not yet expired, then the timer is continuously checked until the time period expires. In this regard, the previously described channel guard interrupt and calculating operations are continuously taking place, however, a comparison with the aforementioned SHORTLOOK threshold is not performed until the end of the SHORTLOOK window.

When the SHORTLOOK timer expires as indicated at 127, a check is then made to determine whether the "TCGCHK" flag is set (129). In this regard, this flag is set by the above-described channel guard interrupt routine, if the vector has grown in magnitude to exceed the SHORTLOOK threshold to indicate that channel guard might be present. As noted above, the SHORTLOOK time period is a frequency dependent, variable time period. This time period is, however, significantly less than 50% of the time period conventionally required to decode channel guard.

If the "TCGCHK" flag is not set, thereby indicating that the received channel does not have the correct channel guard, then it is necessary to abort the received channel. Thereafter, a check is made at decision block 131 to determine whether the priority (or PRI 1) channel is the channel which is being scanned as indicated by the "PlSCAN" flag. If the check at block 131 indicates that a priority channel scan is not being performed, then the state of the "CorS" flag is switched (137). Thereafter, the state is set to one (139) and the routine branches to the scan function routine shown in FIG. 4 (141).

If the "PlSCAN" flag has been set as indicated by the check at 131, then the "PlSCAN" flag is cleared (133). Thereafter, a state is branched to which resets the radio to scan the non-priority channel so that communications on the non-priority channel are not missed (135).

If the check at block at 129 reveals that the SHORTLOOK threshold has been exceeded, thereby indicating that channel guard frequency might be present, the SECONDLOOK timer is initiated (143) to initiate the SECONDLOOK window. It is noted that the routine does not reset the channel guard timer at the initiation of the SECONDLOOK window. Instead, the interrupt process and the associated vector growth calculations continue during the SECONDLOOK time frame. After the SECONDLOOK timer is initiated, the state is set to 12 (145) and the control is returned to the main routine (147).

Figure 9:
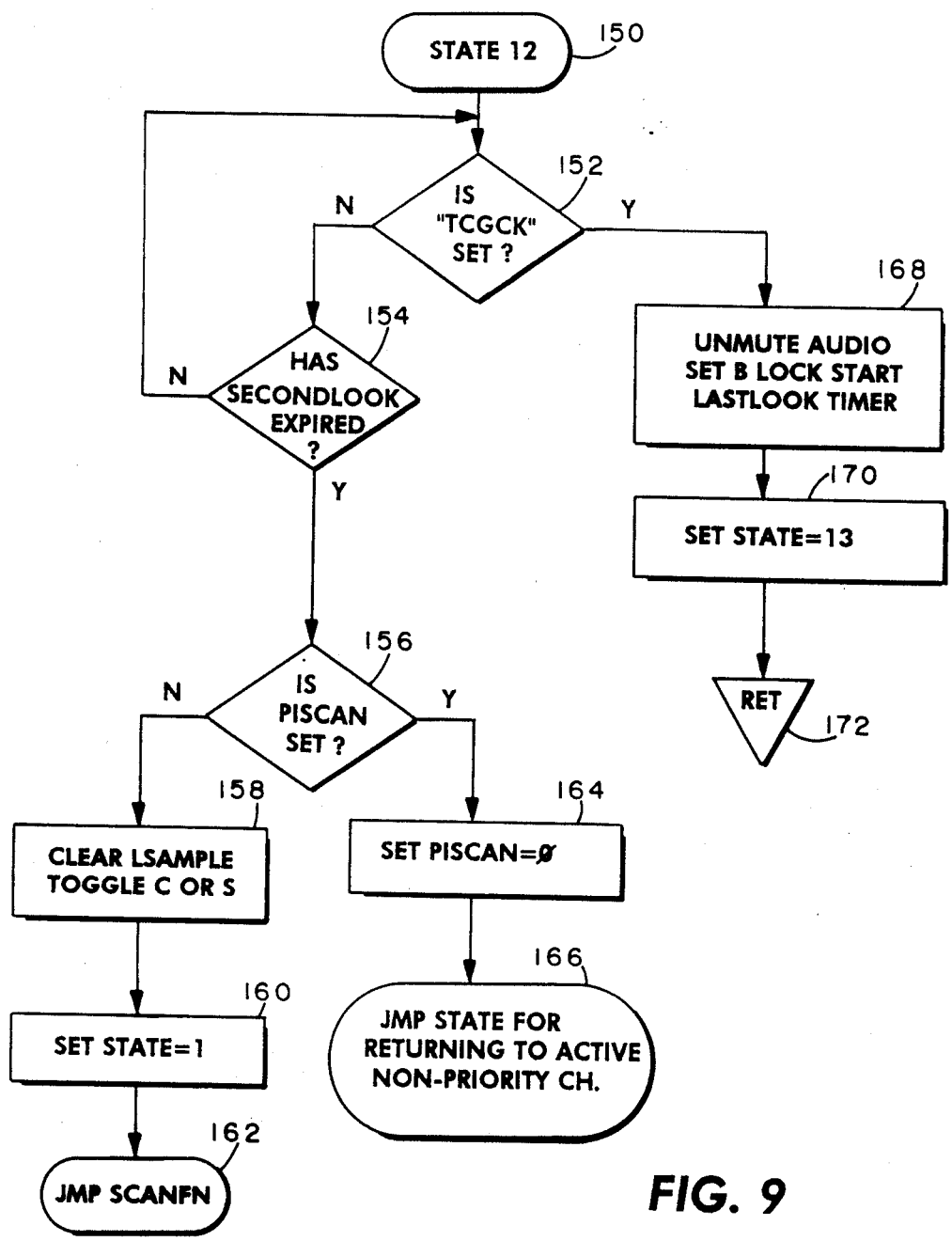
FIG. 9 is a flowchart showing the sequence of operations occurring during state 12, which relate channel guard detection during the SECONDLOOK window.

As shown in FIG. 9, upon entry into state 12 (150), a check is initially made at block 152 to determine whether the flag "TCGCK" is set, which indicates that the SECONDLOOK vector threshold has been exceeded. If this flag is set, as described above, there is an extremely high probability that the channel guard is present. Thus, in contrast to state 6, where a check is initially made to determine whether the SHORTLOOK window has expired, state 12 immediately determines whether the threshold has been exceeded regardless of whether the SECONDLOOK timer has expired.

If the "TCGCK" flag is not set, then a check is made to determine whether the SECONDLOOK timer has expired (154). If the SECONDLOOK timer has not yet expired then the routine branches back to block 152 where a check is again made to determine whether the SECONDLOOK threshold has been exceeded by checking the "TCGCK" flag.

If the check at block 152 reveals that the SECONDLOOK threshold has been exceeded, then the audio is immediately unmuted (168). Thus, if a strong signal is received allowing channel guard to be detected faster than at the expiration of the SECONDLOOK time period, state 12 advantageously permits the audio to be immediately unmuted so that communications can commence as rapidly as possible.

On the other hand, if the SECONDLOOK timer expires and the SECONDLOOK threshold has not yet been exceeded (154), then the system is effectively informed that, although SHORTLOOK indicated that the channel guard might be present, the SECONDLOOK window processing reveals that the channel guard is not, in fact, present. If the SECONDLOOK timer has expired without the threshold being exceeded, a check is made at block 156 to determine whether the "P1SCAN" flag is set as previously described in conjunction with decision block 131 in state 6.

If the check at 156 reveals that the "P1SCAN" flag is not set, then a flag "LSAMPLE" is cleared which indicates that the P1 channel did not have channel guard transmitted on it. Additionally, as described in conjunction with state 6, the "CorS" flag is toggled (158). Thereafter, the state is set to one (160) and the routine jumps to the scan function (162).

If the "P1SCAN" flag check at 156 reveals that the flag is set, then, as previously described in conjunction with state 6, the "P1SCAN" flag is cleared and the routine jumps to a state for resetting the radio to scan the non-priority channel so that communications on the non-priority channel are not missed.

As indicated above, if the SECONDLOOK threshold is exceeded as indicated by the check at block 152, the audio is immediately unmuted (166) to allow a user to, for example, hear the communications on the priority channel. A flag referred to in block 168 as "LOCK" is set to indicate that the scan is locked on a channel and has found the correct channel guard tone. At this time, the LASTLOOK timer is initiated (168). Thereafter, the state is set to thirteen (170) and control is returned to the main routine (172).

Figure 10:
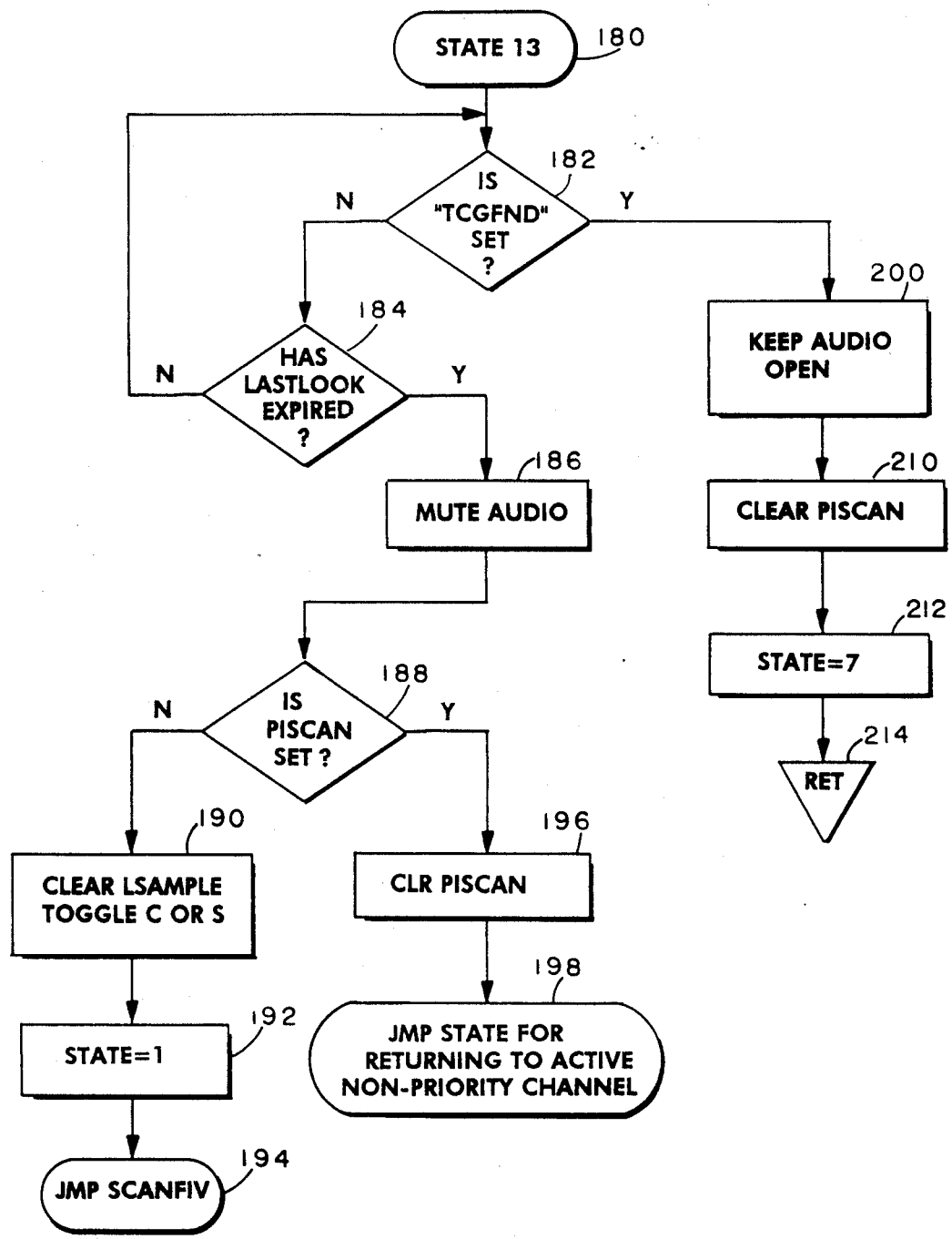
FIG. 10 is a flowchart showing the sequence of operations occurring during state 13, which relate to channel guard detection during the LASTLOOK window.

As shown in FIG. 10, upon entry into state 13 (180), a check is made to determine whether a "TCGFND" flag is set (182) which indicates that the LASTLOOK threshold has been exceeded by the vector whose growth is being monitored. If the "TCGFND" flag is not set, then a check is made to determine whether the LASTLOOK timer has expired (184). If the LASTLOOK timer has not expired, then the routine branches back to block 182 where a check is again made to determine whether the "TCGFND" flag is set.

If the timer expires before the threshold is exceeded, then the audio is muted (186) because the correct channel guard tone was not received. It is noted that it is highly unlikely for the SECONDLOOK window to indicate that the channel guard is present and the LASTLOOK window to indicate that, in fact, the channel guard tone pattern is not present.

After muting the audio at block 186, a check is made to determine whether the scan is a priority channel scan by checking whether the "P1SCAN" flag is set (188). If the "P1SCAN" flag is not set, as described previously in conjunction with FIG. 9, the LSAMPLE flag is cleared and the "CorS" flag is toggled (190). Thereafter, the state is set equal to one (192) and the routine branches to the scan function routine shown in FIG. 4 (194).

If the "P1SCAN" flag is set, then the "P1SCAN" flag is cleared (196) and the routine jumps to the state for scanning the non-priority channel (198) as described in conjunction with FIG. 9.

If the "TCGFND" flag is set, as indicated by the check at block 182 (indicating that the LASTLOOK threshold has been reached), then the audio is kept open (200). Thereafter, the "P1SCAN" flag is cleared because the radio is locked onto a channel. Thereafter, the system is set to state 7 (212) and control is returned to the main routine (214).

State 7 is utilized after determining in the SHORTLOOK, SECONDLOOK, and LASTLOOK windows that the channel guard tone pattern is present. It serves to lock the system onto the channel to listen to the audio on that channel.

Figure 11:
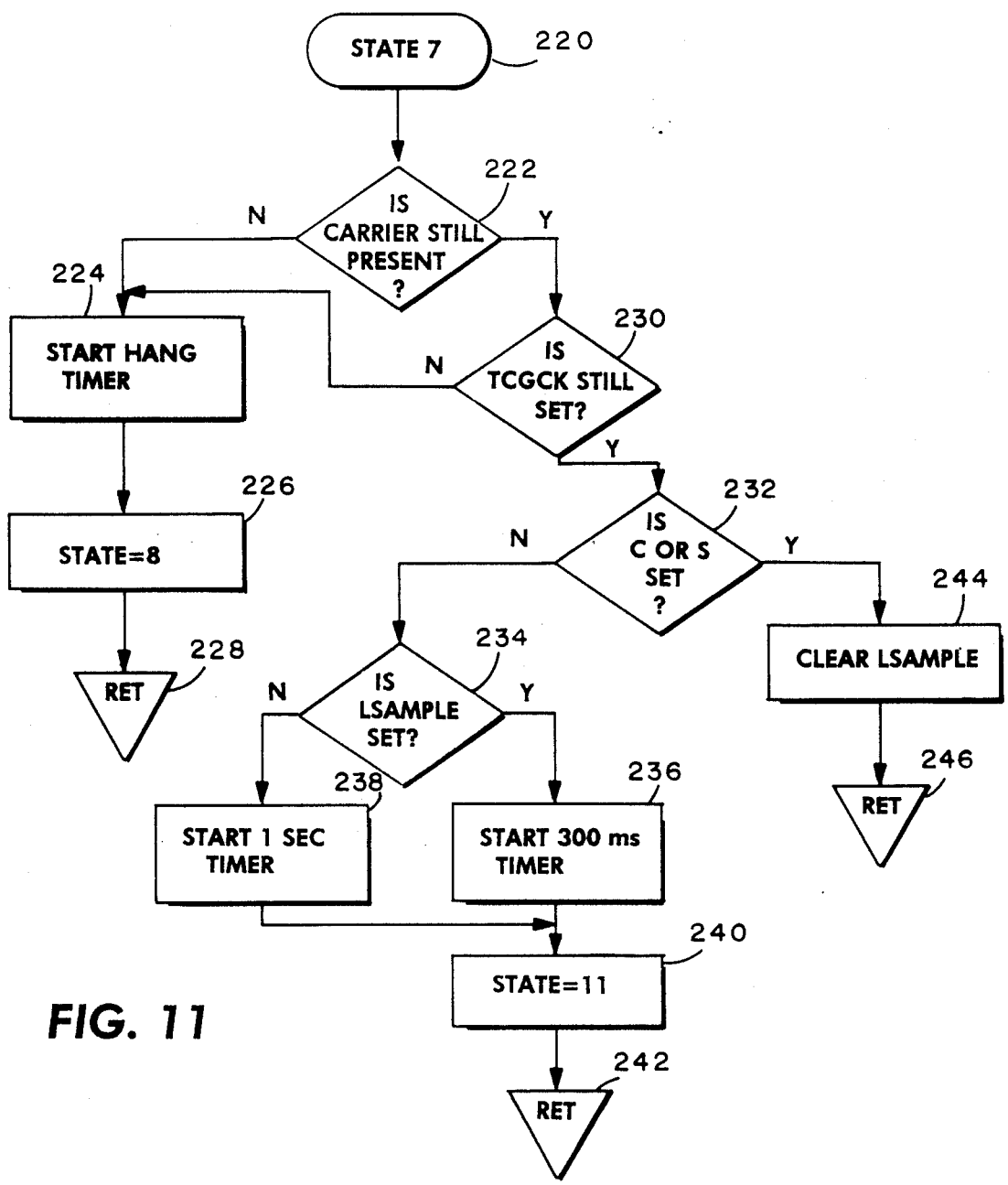
FIG. 11 is a flowchart showing the sequence of operations occurring during state 7 after a correct channel guard sequence has been detected.

As shown in FIG. 11, a check is made at 222 to determine whether a carrier is still present. In this regard, if a carrier goes away either due to at the end of a conversation or for some other reason, a hang timer is initiated (224). The hang timer is a counter which may, for example, be set to 300 milliseconds. The hang timer insures that the radio is still locked on the channel, if the carrier goes away for a short period of time and then returns. In this fashion, even though there may be a small hole in the conversation, the conversation will be permitted to continue. The hang timer processing occurs in state 8 (226). This processing is not particularly germane to the present invention and will not be described further. After being set to state 8, the routine returns control to the main routine (228).

If the carrier is still present as indicated at 222, a check is made at block 230 to determine whether the tone channel guard "TCGCK" flag is still set. If the correct channel guard does not continue, then the hang timer is initiated (224).

If the check at block 230 reveals that the correct channel guard tone is still being detected, then a check is made at block 232 to determine whether the "CorS" flag is set to determine whether the radio is locked on to the priority channel or the non-priority channel. If the radio is locked on the priority channel, then the "LSAMPLE" flag (which indicates that channel guard has been detected on the priority channel) is no longer needed and is cleared (244) and the routine returns control to the main routine (246).

If the "CorS" flag is not set (indicating that the radio is locked on the non-priority channel), then a check is made at 234 to determine whether the "LSAMPLE" flag is set. In this regard, it is noted that if there no carrier present on the priority channel, then the "LSAMPLE" flag is set to one. If the check at block 234 indicates that the "LSAMPLE" flag is set, then the priority channel is scanned every 300 milliseconds by initiating a 300 millisecond timer (236). The "LSAMPLE" flag is cleared even though carrier activity is found, if an incorrect channel guard was detected during the last scan of the priority channel. Thus, if the last scan of the priority channel resulted in the "LSAMPLE" flag being cleared, then the priority channel is scanned every second by initiating a 1 second timer (238). Thus, two different rates are established for scanning the priority channel depending upon the last sample of the priority channel.

After either the one second timer (238) or the 300 millisecond timer (236) is initiated, the routine sets the system to a state 11 (240), which controls the scanning of the priority channel at one of the two sampling rates while the non-priority channel is active (240). Thereafter, control is returned to the main routine (242).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a radio communications device having a receiver for receiving a predetermined pattern of tones or digital data for enabling the receiver to receive transmitted audio signals, apparatus for detecting the presence of said predetermined pattern comprising:
   means for defining a first timing window, said means for defining a first timing window including means for defining a variable time period whose length is dependent upon a characteristic of said predetermined pattern;
   first means for determining whether said predetermined pattern might be present at a time defined by said first timing window and for generating a pattern might be present signal if said predetermined pattern might be present;
   means responsive to said pattern might be present signal for defining a second timing window;
   second means for determining during said second timing window whether said predetermined pattern is most probably present and for generating a pattern most probably present signal; and
   means responsive to said pattern most probably present signal for enabling the receiver to receiver transmitted audio signals.

2. Apparatus according to claim 1, wherein said characteristic is the frequency of said predetermined pattern and said means for defining a second timing window includes means for defining a variable time period dependent upon the frequency of said predetermined pattern.

3. Apparatus according to claim 1, wherein said means for defining a second timing window is initiated at the expiration of said first timing window.

4. Apparatus according to claim 1, further including means for determining whether a carrier is present on a predetermined channel, and wherein said means for defining a first timing window is responsive to a determination that a carrier is present to initiate said first timing window.

5. Apparatus according to claim 1, wherein said first means for determining whether said predetermined time period might be present is responsive to the expiration of said first timing window to determine whether said predetermined pattern might be present.

6. Apparatus according to claim 1, wherein said second means for determining includes means for determining whether said predetermined pattern is most probably present beginning at the initiation of said second timing period until the end of said second timing period, whereby said means for enabling said audio may be controlled to open the receiver audio at any time during the second window in response to the generation of said predetermined pattern is most probably present signal.

7. Apparatus according to claim 5, wherein said second means for determining includes means for determining whether said predetermined pattern is probably present beginning at the initiation of said second timing period until the end of said second timing period, whereby said means for enabling said audio may be controlled to open the receiver audio at any time during the second window in response to the generation of said predetermined pattern is most probably present signal.

8. Apparatus according to claim 1, wherein said first means for determining whether said predetermined pattern might be present includes:
   interrupt means for periodically sampling a received signal;
   means for detecting the high to low transitions of said received signal; and means for accumulating over time the high to low received signal transitions and for assigning a value corresponding to the accumulated transitions which is indicative of the correspondence of a received pattern to said predetermined pattern.

9. Apparatus according to claim 8, wherein said first means for determining whether said predetermined pattern might be present includes means for comparing said value with a first predetermined threshold.

10. Apparatus according to claim 9, wherein said first means for determining includes means responsive to said comparison for setting a predetermined pattern might be present flag if said value exceeds said first predetermined threshold.

11. Apparatus according to claim 1, wherein said second means for determining whether said predetermined pattern is most probably present includes:
   interrupt means for periodically sampling a received signal;
   means for detecting the high to low transitions of said received signal; and
   means for accumulating over time the high to low signal transitions and for assigning a value corresponding to the accumulated transitions which is indicative of the correspondence of a received pattern to said predetermined pattern.

12. Apparatus according to claim 11, wherein said second means for determining whether said predetermined pattern is most probably present includes means for comparing said value with a second predetermined threshold.

13. Apparatus according to claim 12, wherein said second means for determining includes means responsive to said comparison for setting a predetermined pattern is most probably present flag if said value exceeds a second predetermined threshold.

14. In a radio communications device having a receiver for receiving a predetermined pattern of tones or digital data for enabling the receiver to receive transmitted audio signals, apparatus for detecting the presence of said predetermined pattern comprising:
   means for defining a first timing window;
   first means for determining whether said predetermined pattern might be present at a time defined by said first timing window and for generating a pattern might be present signal if said predetermined pattern might be present;
   means responsive to said pattern might be present signal for defining a second timing window;
   second means for determining during said second timing window whether said predetermined pattern is most probably present and for generating a pattern most probably present signal;

means responsive to said pattern most probably present signal for enabling the receiver to receiver transmitted audio signals;

means responsive to said pattern is most probably present signal for defining at least one further timing window; and third means for determining whether said predetermined pattern is present during said at least one further window.

15. Apparatus according to claim 14, further including means for muting said receiver audio if said predetermined pattern is not detected during said at least one further window.

16. Apparatus according to claim 1, wherein said receiver includes means for receiving signals on a priority channel and at least one other channel; and means for scanning at least said priority channel and for returning to said priority channel from an active channel upon the detection of carrier activity and said predetermined pattern.

17. Apparatus according to claim 16, wherein said means for scanning includes microprocessor control means for executing a sequence of subroutines each of which controls a sequence of operations defining a channel scanning state.

18. A radio communications device having a receiver for receiving a channel guard pattern for enabling the receiver to receive transmitted audio signals, said receiver including means for receiving signals on a priority channel and at least one other channel, said radio communications device comprising:

means for scanning at least said priority channel while receiving audio signals on an active channel;

means for detecting the presence of a carrier on a scanned channel; and means for detecting the presence of a channel guard pattern on said scanned channel; said means for detecting the presence of a channel guard pattern including means for opening the audio on said scanned channel as soon as said channel guard pattern is most probably detected, said means for detecting the presence of a channel guard pattern further including means for defining a first timing window having a variable time period whose length is dependent upon a predetermined characteristic of said channel guard pattern.

19. A device according to claim 18, wherein said means for detecting the presence of a channel guard pattern further including:

first means for determining whether said channel guard pattern might be present during a time defined by said first timing window and for generating a channel guard might be present signal if said channel guard pattern might be present;

means responsive to said channel guard might be present signal for defining a second timing window;

second means for determining during said second timing window whether said channel guard pattern is most probably present and for generating a channel guard most probably present signal; and means responsive to said channel guard most probably present signal for enabling the received to receive transmitted audio signals.

20. A device according to claim 19, wherein said predetermined characteristic is the frequency of said channel guard pattern and said means for defining a second timing window includes means for defining a variable time period dependent upon the frequency of said channel guard pattern.

21. A device according to claim 19, wherein said means for defining a second timing window is initiated at the expiration of said first timing window.

22. A device according to claim 19, wherein said means for defining a first timing window is responsive to the determination that a carrier is present to initiate said first timing window.

23. A device according to claim 19, wherein said means for determining whether said predetermined time period might be present is responsive to the expiration of said first timing window to determine whether said channel guard pattern might be present.

24. Apparatus according to claim 19, wherein said first second means for determining includes means for determining whether said predetermined pattern is most probably present from the initiation of said second timing period until the end of said second timing period, whereby said means for enabling said audio may be controlled to open the receiver audio at any time during the second window in response to the generation of said channel guard is most probably present signal.

25. Apparatus according to claim 19, wherein said first means for determining whether said channel guard pattern might be present includes:

interrupt means for periodically sampling a received signal;

means for detecting the high to low transitions of said received signal; and means for accumulating over time the high to low signal transitions and for assigning a value corresponding to the accumulated transitions which is indicative of the correspondence of a received pattern to said channel guard pattern.

26. Apparatus according to claim 25, wherein said first means for determining whether said channel guard pattern might be present includes means for comparing said value with a first predetermined threshold.

27. Apparatus according to claim 26, wherein first means for determining includes means responsive to said comparison for setting a channel guard pattern may be present flag if said value exceeds said first predetermined threshold.

28. Apparatus according to claim 19, wherein said second means for determining whether said channel guard pattern is most probably present includes:

interrupt means for periodically sampling a received signal;

means for detecting the high to low transitions of said received signal; and means for accumulating over time the high to low signal transitions and for assigning a value corresponding to the accumulated transitions which is indicative of the correspondence of a received pattern to said channel guard pattern.

29. Apparatus according to claim 28, wherein said second means for determining whether said channel guard pattern is most probably present includes means for comparing said value with a second predetermined threshold.

30. Apparatus according to claim 29, wherein said second means for determining includes means responsive to said comparison for setting a channel guard pattern is most probably present flag if said value exceeds a second predetermined threshold.

31. A radio communications device having a receiver for receiving a channel guard pattern for enabling the receiver to receive transmitted audio signals, said receiver including means for receiving signals on a priority channel and at least one other channel, said radio communications device comprising:
- means for scanning at least said priority channel while receiving audio signals on an active channel;
- means for detecting the presence of a carrier on a scanned channel;
- means for detecting the presence of a channel guard pattern on said scanned channel; said means for detecting the presence of a channel guard pattern including means for opening the audio on said scanned channel as soon as said channel guard pattern is most probably detected, wherein said means for detecting the presence of channel guard includes:
- means for defining a first timing window;
- first means for determining whether said channel guard pattern might be present during a time defined by said first timing window and for generating a channel guard might be present signal if said channel guard pattern might be present;
- means responsive to said channel guard might be present signal for defining a second timing window;
- second means for determining during said second timing window whether said channel guard pattern is most probably present and for generating a channel guard most probably present signal;
- means responsive to said channel guard most probably present signal for enabling the receiver to receive transmitted audio signals
- means responsive to said channel guard pattern is most probably present signal for defining at least one further timing window; and
- third means for determining whether said channel guard pattern is present during said at least one further window.

32. A device according to claim 18, wherein said means for scanning includes microprocessor control means for executing a sequence of subroutines, each of which controls a sequence of operations defining a predetermined channel scanning state.

33. In a radio communications device having a receiver for receiving a predetermined pattern of tones or digital data for enabling the receiver to receive transmitted audio signals, a method for detecting the presence of said predetermined pattern comprising the steps of:
- defining a first timing window having a variable time period whose length depends upon a predetermined characteristic of said predetermined pattern;
- determining whether said predetermined pattern might be present at a time defined by said first timing window and generating a pattern might be present signal if said predetermined pattern might be present;
- defining, in response to said pattern might be present signal, a second timing window;
- determining during said second timing window whether said predetermined pattern is most probably present and generating a predetermined pattern is most probably present signal; and
- enabling the receiver to receive transmitted audio signals in response to said predetermined pattern is most probably present signal.

34. A method according to claim 33, wherein said predetermined characteristic is the frequency of said predetermined pattern and said step of defining a second timing window includes the step of defining a variable time period dependent upon the frequency of said predetermined pattern.

35. A method according to claim 33, wherein said step of defining a second timing window is initiated at the expiration of said first timing windows.

36. A method according to claim 33, further including the step of determining if a carrier is present on a predetermined channel; and wherein said step of defining a first timing window is responsive to the determination that a carrier is present to initiate said first timing window.

37. A method according to claim 33, wherein said step of determining whether said predetermined time period might be present is responsive to the expiration of said first timing window to determine whether said predetermined pattern might be present.

38. A method according to claim 33, wherein said step of determining whether said predetermined pattern is most probably present includes the step of determining whether said predetermined pattern is probably present beginning at the initiation of said second timing period until the end of said second timing period, whereby said step of enabling said audio serves to open the receiver audio at any time during the second window in response to the generation of the predetermined pattern is most probably present signal.

39. A method according to claim 33, wherein said step of determining whether said predetermined pattern might be present includes the steps of:
- sampling a received signal at predetermined time periods to detect said predetermined patterns;
- detecting the high to low transitions of said received signal; and
- accumulating over time the high to low signal transitions; and
- assigning a value corresponding to the accumulated transitions which is indicative of the correspondence of a received pattern to said predetermined pattern.

40. A method according to claim 39, wherein said step of determining whether said predetermined pattern might be present includes the steps of comparing said value with a first predetermined threshold.

41. A method according to claim 40, wherein the step of determining whether said predetermined pattern might be present includes the step of setting a predetermined pattern may be present flag if said value exceeds said first predetermined threshold.

42. A method according to claim 33, wherein said step of determining whether said predetermined pattern is most probably present includes the steps of:
- sampling a received signal at predetermined time periods to detect said predetermined pattern;
- detecting the high to low transitions of said received signal; and
- accumulating over time the high to low signal transitions; and
- assigning a value corresponding to the accumulated transitions which is indicative of the correspondence of a received pattern to said predetermined pattern.

43. A method according to claim 42, wherein said step of determining whether said predetermined pattern is most probably present includes the steps of comparing said value to a second predetermined threshold.

44. A method according to claim 43, wherein said step of determining whether said pattern is most probably present includes the steps of setting a predetermined pattern is most probably present flag if said value exceeds a second predetermined threshold.

45. In a radio communications device having a receiver for receiving a predetermined pattern of tones or digital data for enabling the receiver to receive transmitted audio signals, a method for detecting the presence of said predetermined pattern comprising the steps of:
   defining a first timing window;
   determining whether said predetermined pattern might be present at a time defined by said first timing window and generating a pattern might be present signal if said predetermined pattern might be present;
   defining, in response to said pattern might be present signal, a second timing window;
   determining during said second timing window whether said predetermined pattern is most probably present and generating a predetermined pattern is most probably present signal;
   enabling the receiver to receive transmitted audio signals in response to said predetermined pattern is most probably present signal;
   responding to said pattern is most probably present signal by defining at least one further timing window; and
   determining whether said predetermined pattern is present during said at least one further window.

46. A method according to claim 33, wherein said receiver includes means for receiving signals on a priority channel and at least one other channel; and said method further includes the steps of:
   scanning at least said priority channel, and returning to said priority channel from an active channel upon the detection of carrier activity and said predetermined pattern.

47. In a radio communications device having a receiver for receiving a channel guard pattern for enabling the receiver to receive transmitted audio signals, said receiver including means for receiving audio signals on a priority channel and at least one other channel, a method for detecting channel guard on a scanned channel comprising the steps of:
   scanning at least said priority channel while receiving audio signals on an active channel;
   detecting the presence of a carrier on a scanned channel; and
   opening the audio on said scanned channel if said channel guard pattern is determined to be most probably present, said step of opening the audio including the step of defining a first timing window for determining whether said channel guard pattern might be present, said first timing period being a variable time period whose length is dependent upon the frequency of said channel guard frequency.

48. A method according to claim 47, wherein the step of opening the audio if the channel guard pattern is determined to be most probably present further includes the steps of:
   determining whether said channel guard pattern might be present during the time period defining by said first timing window and generating a channel guard might be present signal if said channel guard pattern might be present;
   defining a second timing window in response to said channel guard might be present signal; and
   determining during said second timing window whether said channel guard pattern is most probably present and generating a channel guard is most probably present signal,
   and enabling the receiver to receive transmitted audio signal.

* * * * *